(12) United States Patent
Lauterbach et al.

(10) Patent No.: US 7,811,536 B2
(45) Date of Patent: Oct. 12, 2010

(54) NITROGEN OXIDES STORAGE CATALYSTS CONTAINING COBALT

(75) Inventors: Jochen Lauterbach, Newark, DE (US); Christopher M. Snively, Clarks Summit, PA (US); Rohit Vijay, Annandale, NJ (US); Reed Hendershot, Breinigsville, PA (US); Ben Feist, Newark, DE (US)

(73) Assignee: University of Delaware, Newark, DE (US)

( * ) Notice: Subject to any disclaimer, the term of this patent is extended or adjusted under 35 U.S.C. 154(b) by 1089 days.

(21) Appl. No.: 11/459,042

(22) Filed: Jul. 21, 2006

(65) Prior Publication Data

US 2007/0053818 A1    Mar. 8, 2007

Related U.S. Application Data

(60) Provisional application No. 60/701,034, filed on Jul. 21, 2005.

(51) Int. Cl.
*B01D 53/56* (2006.01)
*B01D 53/94* (2006.01)
*B01J 23/02* (2006.01)
*B01J 23/75* (2006.01)

(52) U.S. Cl. ............. 423/213.2; 423/213.5; 423/239.1; 60/299; 60/301; 502/325; 502/326; 502/328; 502/340; 502/300

(58) Field of Classification Search ............. 423/213.2, 423/213.5, 239.1; 60/299, 301; 502/325, 502/326, 328, 340, 300
See application file for complete search history.

(56) References Cited

U.S. PATENT DOCUMENTS

| | | | |
|---|---|---|---|
| 4,294,726 A | 10/1981 | Bozon et al. | |
| 4,923,842 A | 5/1990 | Summers | |
| 5,727,385 A | 3/1998 | Hepburn | |
| 5,804,152 A | 9/1998 | Miyoshi et al. | |
| 6,133,185 A | 10/2000 | Kinugasa et al. | |
| 6,685,900 B2 | 2/2004 | Domesle et al. | |
| 6,777,370 B2 | 8/2004 | Chen | |
| 2007/0053818 A1* | 3/2007 | Lauterbach et al. | 423/239.1 |

OTHER PUBLICATIONS

W. Bögner, et al., "Removal of nitrogen oxides from the exhaust of a lean-tune gasoline engine," in *Applied Catalysis B: Environment* 7 (1995) 153-171.
K. Yamazake, et al., "Effect of the addition of transition metals to Pt/Ba/Al$_2$O$_3$ catalyst on the NO$_x$ storage-reduction catalysis under oxidizing conditions in the presence of SO$_2$," in *Applied Catalysis B: Environmental* 30 (2001) 459-468.
R. Hendershot, et al., "Development and optimization of NO$_x$ storage and reduction catalysts using statistically guided high-throughput experimentation," in *Catalysis Today*, 98 (2004) 375-385.
X.Li, et al., "Effect of Cobalt Promoter on Structure and Properties of Lean-Burn NO$_x$ Trap Pt/Ba-Al-O," in *Chinese Journal of Catalysis*, vol. 23, No. 5, (Sep. 2002), 417-420.
R. Hendershot, et al., "A novel reactor system for high throughput catalyst testing under realistic conditions," in *Applied Catalysis A: General* 254 (2003), 107-120.
L. J. Gill, et al., "The use of NO$_x$ absorber catalysts on diesel engines," in *Topics In Catalysis*, vol. 28, Nos. 1-4, (Apr. 2004) 157-164.
R. Vijay et al., "Noble metal free NO$_x$ storage catalysts using cobalt discovered via high-throughput experimentation," *Catalysis Communications* 6, (2005) 167-171.
B. J. Cooper, et al.; "Aspects of Automotive Catalyst Preparation, Performance and Durability"; Catalysis and Automotive Pollution Control; 1987; Elsevier Science Publishers B.V., Amsterdam—Printed in the Netherlands; pp. 117-141.

* cited by examiner

*Primary Examiner*—Timothy C Vanoy (57) ABSTRACT

Nitrogen oxides (NO$_x$) storage catalysts comprising cobalt and barium with a lean NO$_x$ storage ratio of 1.3 or greater. The NO$_x$ storage catalysts can be used to reduce NO$_x$ emissions from diesel or gas combustion engines by contacting the catalysts with the exhaust gas from the engines. The NO$_x$ storage catalysts can be one of the active components of a catalytic converter, which is used to treat exhaust gas from such engines.

29 Claims, 6 Drawing Sheets

NITROGEN OXIDES STORAGE CATALYSTS CONTAINING COBALT

This application claims priority to U.S. Provisional application 60/701,034, filed Jul. 21, 2005, the entire disclosure of which is incorporated herein by reference.

This work was supported by the National Science Foundation (Grant #0343758-CTS), and the Office of Basic Energy Sciences, U.S Department of Energy (Grant # DE-FG02-03ER15468).

FIELD OF THE INVENTION

The invention is related to nitrogen oxides ($NO_x$) storage catalysts, and the use of such catalysts to treat exhaust gas containing nitrogen oxides.

BACKGROUND OF THE INVENTION

Elimination of $NO_x$ from the exhaust of a lean-burn engine is a challenging problem because it can only be removed via reduction. For example, a diesel engine operating under lean conditions with excess oxygen provides excellent fuel economy, however the reduction of $NO_x$ in these oxidizing conditions is very difficult. For a gasoline engine operating under stoichiometric conditions three-way catalyst technology can be used to reduce HC (hydrocarbon), CO and $NO_x$ emissions. However, as with the diesel engine, the three-way catalyst is not able to reduce $NO_x$ under lean conditions. Therefore, with respect to both engine types there remains a need for the development of new catalyst systems to remove $NO_x$ from the exhaust gas under lean-burn conditions.

The conversion of $NO_x$ to stable nitrates, and storing the nitrates under lean conditions, followed by reducing the nitrates or "stored $NO_x$" to dinitrogen under rich conditions has been investigated with some success. Some of the early $NO_x$ storage catalysts fitted to the exhaust systems of vehicles contained barium compounds. These catalyst systems stored $NO_x$ when the engines operated under lean conditions, and reduced the stored $NO_x$ when the gas was made rich. See, B. J. Cooper, et al. in *Catalysis and Automotive Pollution Control*, eds. A. Curcq and A. Frennet (Elsevier, Amsterdam, 1987) p. 117. Unfortunately, the present levels of sulfur compounds in fuel and the resulting $SO_2$ in the exhaust gas has prevented the commercial introduction of these catalysts, which are relatively susceptible to sulfur poisoning.

A new generation of $NO_x$ storage catalysts tested against simulated exhaust gas from a lean-burn gasoline engine has provided an average $NO_x$ conversion of more than 90% over a test cycle in which the air/fuel ratio was cycled between lean and rich. See, W. Bögner, et al., *Applied Catalysis* B7 (1995) 153. The feed gas was alternated between oxidizing (lean) and a short reducing (rich) period every two minutes or so resulting in $NO_x$ storage during the lean period and conversion to dinitrogen during the rich period.

Over the past decade significant efforts have been made toward the development of $NO_x$ storage catalysts containing platinum as well as other noble metals as an oxidative and reductive catalyst. Barium has been used as the primary $NO_x$ storage material though other $NO_x$ storage components have also been investigated. The use of transition metals to improve resistance to sulfur poisoning has also been investigated. See, K. Yamazaki, et al., *Applied Catalysis*, B 30 (2001) 459.

Lean burn gasoline and diesel engines not only improve the fuel efficiency of automobiles, but also lead to a reduction in the emission of greenhouse gases. Impeding the widespread implementation of lean burn engines is the inability of current three-way catalytic converters to reduce nitrogen oxides under oxidizing lean conditions. Extensive research has been performed in search of alternative catalysts that will reduce $NO_x$ in oxygen rich environments under steady state conditions, but an acceptable catalyst has not yet been discovered.

SUMMARY OF THE INVENTION

Nitrogen oxides ($NO_x$) storage catalysts comprising cobalt and barium with a lean $NO_x$ storage ratio of 1.3 or greater. The $NO_x$ storage catalysts can be used to reduce $NO_x$ emissions from diesel or gas combustion engines by contacting the catalysts with the exhaust gas from the engines. The $NO_x$ storage catalysts can be one of the active components of a catalytic converter, which is used to treat exhaust gas from such engines.

BRIEF DESCRIPTION OF THE DRAWINGS

This invention will be better understood by reference to the Detailed Description of the Invention when taken together with the attached drawings, wherein.

DETAILED DESCRIPTION OF THE INVENTION

The addition of cobalt to traditional platinum/barium $NO_x$ storage catalysts has led to a significant increase in $NO_x$ storage. Also, by using cobalt as the oxidizing metal in $NO_x$ storage catalysts the amount of platinum in such catalysts can be reduced. In fact, the cobalt can completely replace the platinum in such catalyst systems. The substitution of cobalt for platinum, the later being about fifty times more expensive than cobalt, provides a significant cost reduction without a sacrifice in catalytic performance.

The $NO_x$ storage catalysts described and claimed in this application can be used to reduce $NO_x$ emissions from diesel or gas combustion engines by contacting the catalysts with the exhaust gas from the engines. In such a case, the catalysts are typically supported on a refractory inorganic oxide. The supported catalysts are used to treat the exhaust gas from gasoline and diesel engines thereby reducing $NO_x$ emissions. In one application, the supported catalysts can form part of a catalytic converter for a vehicle.

The $NO_x$ storage catalysts comprise cobalt and barium, and have a lean $NO_x$ storage ratio of 1.3 or greater. Other $NO_x$ storage catalysts of the invention can have a lean $NO_x$ storage ratio of 1.5 or greater. Still other $NO_x$ storage catalysts of the invention can have a lean $NO_x$ storage ratio of 2.0 or greater.

In one embodiment, the catalyst can further contain platinum. The platinum is typically present in smaller amounts than $NO_x$ storage traditional catalysts based solely on barium and platinum.

The presence of the cobalt in the catalyst provides the necessary oxidizing regions necessary to reduce $NO_x$ emissions. In one embodiment, the $NO_x$ storage catalysts are used in combination with a reduction catalyst containing rhodium. The two catalytic components of the catalyst system work together to reduce $NO_x$ emissions from exhaust gas.

In another embodiment, the $NO_x$ storage catalysts consist essentially of cobalt, platinum and barium supported on an inorganic oxide. Again, the catalyst has a lean $NO_x$ storage ratio of 1.3 or greater. Typically, the cobalt is predominantly in the form of $Co_3O_4$ and the barium in the form of $BaCO_3$.

Figure 1:
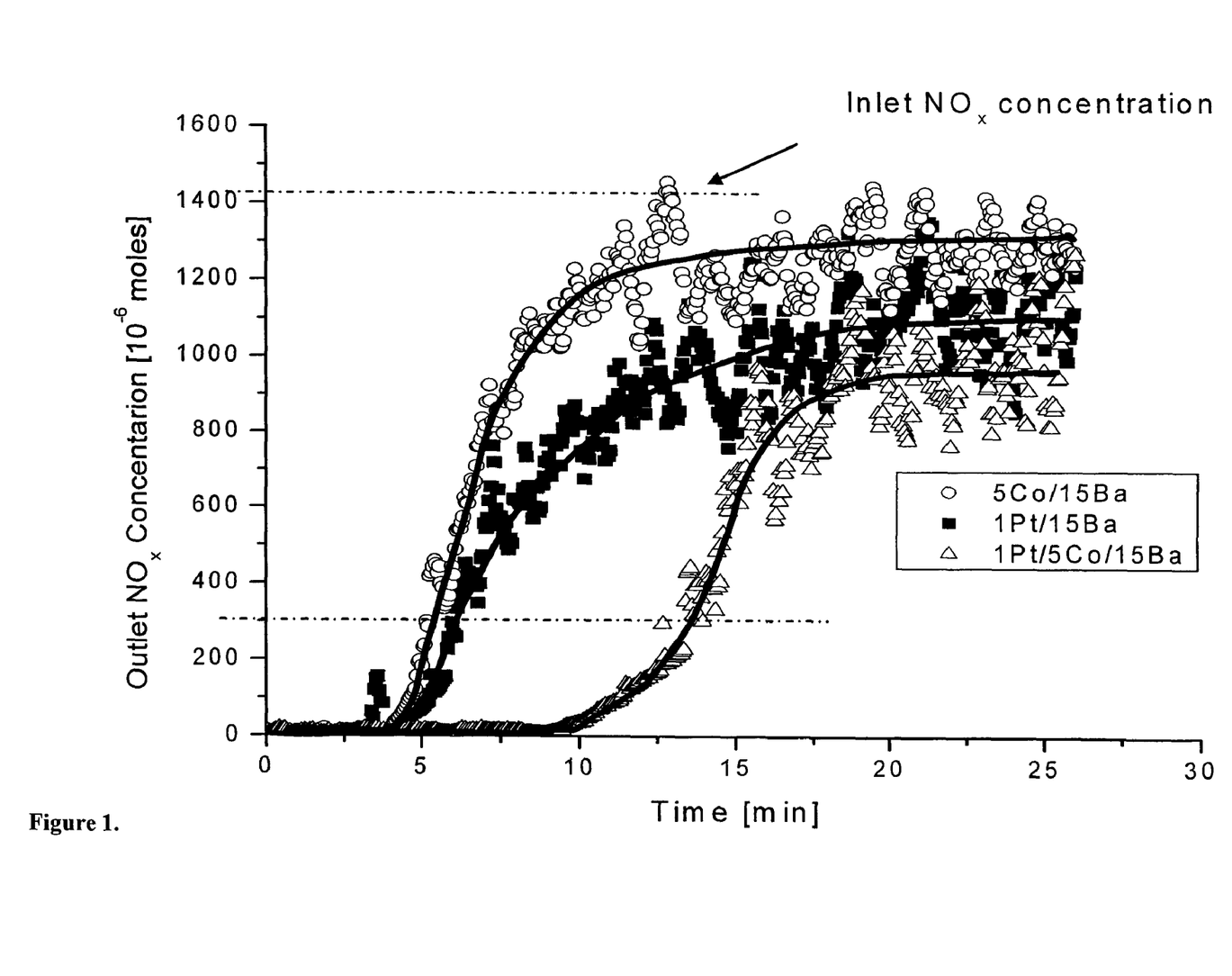
FIG. 1 is a representation of the $NO_x$ storage capacity for the catalysts that contain cobalt and that of a traditional Pt/Ba catalyst.

The term "lean $NO_x$ storage ratio" is a catalytic performance ratio defined by the following relationship:

$$[xPt\, yBa\, zCo]/\{[xPt\, yBa]+[zCo]\}$$

wherein [xPt yBa zCo] is the lean $NO_x$ storage value for a catalyst of the invention containing cobalt, barium and platinum; [xPt yBa] is the lean $NO_x$ storage value for a platinum-barium catalyst without cobalt; and [zCo] is the lean $NO_x$ storage value for a cobalt catalyst. The lean $NO_x$ storage value for each of the $NO_x$ storage catalysts is determined by measuring the integrated area between the inlet $NO_x$ concentration and outlet $NO_x$ concentration in the fuel lean state from time zero to the time the outlet $NO_x$ concentration is 300 ppm for each of the $NO_x$ storage catalysts as represented by FIG. 1. The lean $NO_x$ storage measurements are collected after the $NO_x$ storage data is reproducible over several rich-lean fuel cycles. See, Example 1.

The lean $NO_x$ storage values are determined using the actual weight loadings for each of the prepared catalysts. The term "actual weight loading" defines a catalyst by the metal's actual weight percent loading, e.g., as measured by atomic absorption or another elemental analysis technique.

One of ordinary skill in the art understands that wet impregnation techniques used to prepare supported metal catalysts typically do not provide actual weight percent loadings based on the nominal weight loading. The term "nominal weight loading" is calculated in-part by the amount of metal precursor used to prepare the catalyst and the weight percentage of metal in the metal precursor. As shown in Example 2, Table 2, the actual weight loadings of a respective metal can be very similar to or very different from the nominal weight loadings. For example, in the case of platinum, the actual weight loading is less than the nominal weight loading in all of the catalysts presented in Table 2. In contrast, there is much less of a difference between actual weight loading and nominal weight loading for cobalt.

Figure 2:
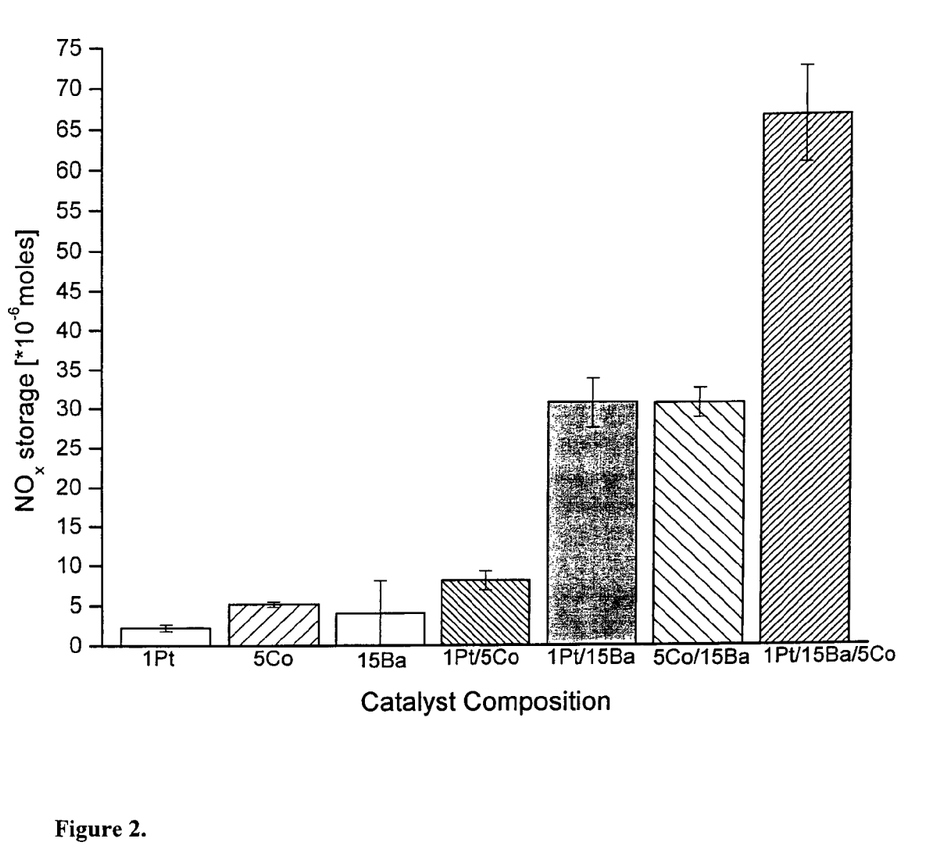
FIG. 2 is a graphical representation comparing the lean $NO_x$ storage values for catalysts of the invention with comparative catalysts.

FIG. 2 is a graphical representation of lean $NO_x$ storage values for each of the stated catalysts. The lean $NO_x$ storage values are calculated by the following mathematical expression and data representative of FIG. 1.

$$NO_x\ storage = \int_{t=0}^{t=to} (inlet\ NO_x - outlet\ NO_x)dt$$

where $t_0$ is the time when the outlet $NO_x$ concentration reaches 300 ppm.

FIG. 2 shows the lean $NO_x$ storage values for the catalysts [1 Pt], [5Co], [15Ba] and [1Pt/5Co]. An exemplary calculation to determine the lean $NO_x$ storage ratio using the data of FIG. 1 for a given catalyst of the invention is as follows. The lean $NO_x$ storage values for [1Pt/15Ba] and [5Co] are 31 µmol/g and 6 µmol/g, respectively. The lean $NO_x$ storage value for [1Pt/15Ba/5Co] is 67 µmol/g. Given these values the "lean $NO_x$ storage ratio" is 67/{31+6} or 1.86.

To calculate lean $NO_x$ storage values the actual weight loading for cobalt, barium and platinum in the inventive catalyst must be within 50% of the actual weight loadings for each of these metals in the non-inventive (comparative catalyst). In the example above, the non-inventive catalysts [1Pt/15Ba] and [Co] have actual weight loadings of 0.58%, 11.75% and 5.32% for platinum, barium and cobalt, respectively. The actual weight loadings of the inventive catalyst are 0.37%, 12.88% and 6.32% for platinum, barium and cobalt, respectively. Therefore, the actual weight loading of the metals: Pt, 0.58-0.37; Ba, 11.75-12.88; and Co, 5.32-6.32 are all within 50% for each respective metal. For example, in the case of platinum (0.58-0.37)/0.58=0.36 (36%).

The invention is directed to $NO_x$ storage catalysts comprising 1 wt % to 8 wt % cobalt, 2 wt % to 20 wt % barium and 0.03 wt % to 1.0 wt % platinum. In some instances, the $NO_x$ storage catalysts will comprise 2 wt % to 6 wt % cobalt, 3 wt % to 12 wt % barium and 0.05 wt % to 0.5 wt % platinum.

In some instances, the $NO_x$ storage catalysts consist essentially of 1 wt % to 8 wt % cobalt, 2 wt % to 20 wt % barium and 0.03 wt % to 1.0 wt % platinum. In some instances, the $NO_x$ storage catalysts will consist essentially of 2 wt % to 6 wt % cobalt, 3 wt % to 12 wt % barium and 0.05 wt % to 0.5 wt % platinum The promotional effect provided by the addition of cobalt to a platinum/barium catalyst is shown by the near doubling of the $NO_x$ storage capacity of the catalyst 1Pt/5Co/15Ba compared to the traditional 1 Pt/15Ba catalyst. As shown in FIG. 1, the time prior to a detectable outlet $NO_x$ concentration for the 1Pt/5Co/15Ba catalyst was nearly twice as long as the time for the other two catalysts. There is also a higher steady state lean $NO_x$ concentration associated with the 5Co/15Ba catalyst than the Pt containing catalysts. The $NO_x$ concentration at steady state is in-part governed by the reducing efficiency of the catalyst, thus the $NO_x$ reducing efficiency of cobalt is believed to be lower than that of platinum.

Figure 3:
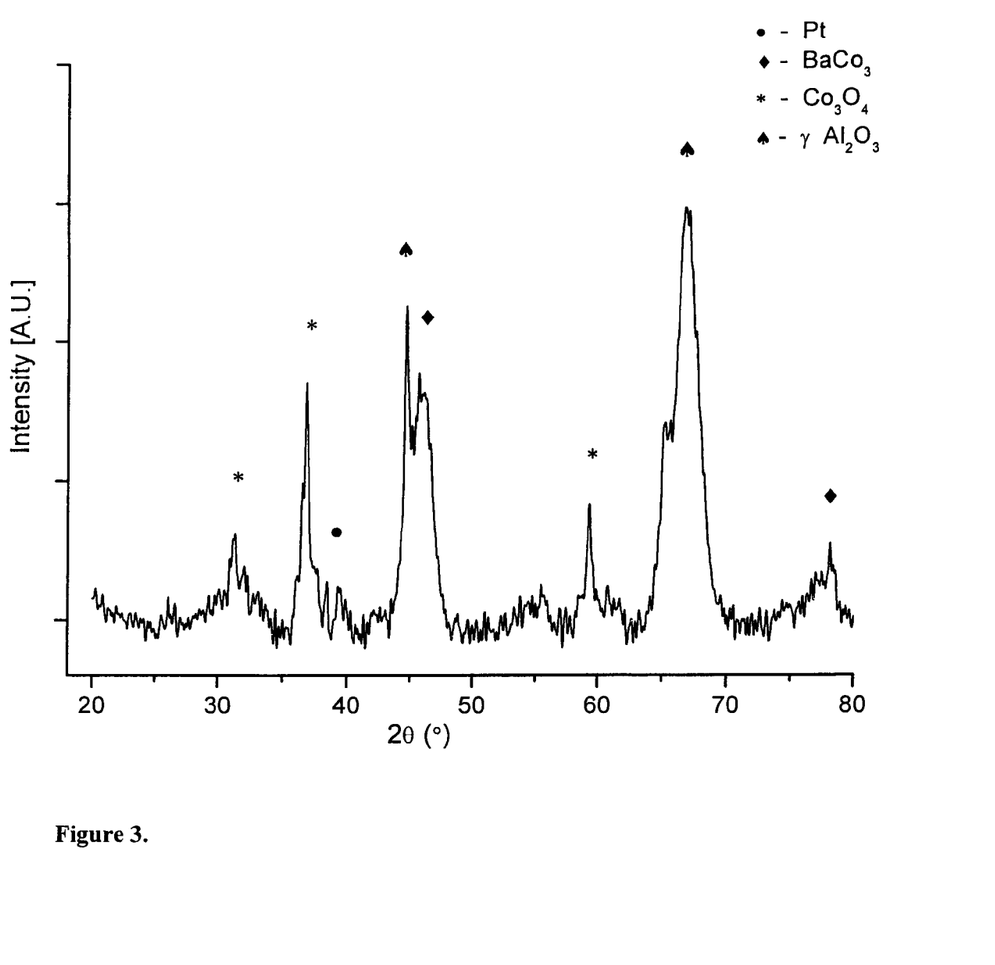
FIG. 3 is the X-ray diffraction pattern of the catalyst 1Pt/15Ba/5Co.

FIG. 3 depicts the X-ray diffraction pattern of the catalyst 1Pt/15Ba/5Co following baseline correction and smoothing using a $2^{nd}$ order polynomial, 11 point Savitzky-Golay algorithm. The peak at approximately 36.8 2θ is attributed to cubic $Co_3O_4$, a material known for its high oxidizing capacity, which can explain the relatively high promotional effect of cobalt over both manganese and iron. The peak at approximately 59.9 2θ is also attributed to $Co_3O_4$. The relatively strong peak at approximately 46.0 2θ is attributed to $BaCO_3$.

It is believed that the $Co_3O_4$ sites adjacent to barium storage sites increase the interface contact area between the oxidizing and storage component of the catalysts. This is important for increasing the $NO_2$ spillover to barium storage sites, another key step in $NO_x$ storage. Therefore, by increasing the NO oxidation and $NO_2$ spillover to barium storage sites in the catalysts an increase in the $NO_x$ storage is observed.

The invention is also directed to $NO_x$ storage catalysts that are platinum-free (Pt-free) catalysts. A Pt-free catalyst contains less than 0.03 wt % platinum. The Pt-free catalysts comprise cobalt and barium. Again, these catalysts are typically supported on an inorganic oxide. The applicants were surprised to find that the $NO_x$ storage performance of the catalyst 5Co/15Ba was essentially equivalent to that of 1 Pt/15Ba suggesting that 5 wt % Co was comparable of 1 wt % Pt with respect to $NO_x$ storage.

Figure 5:
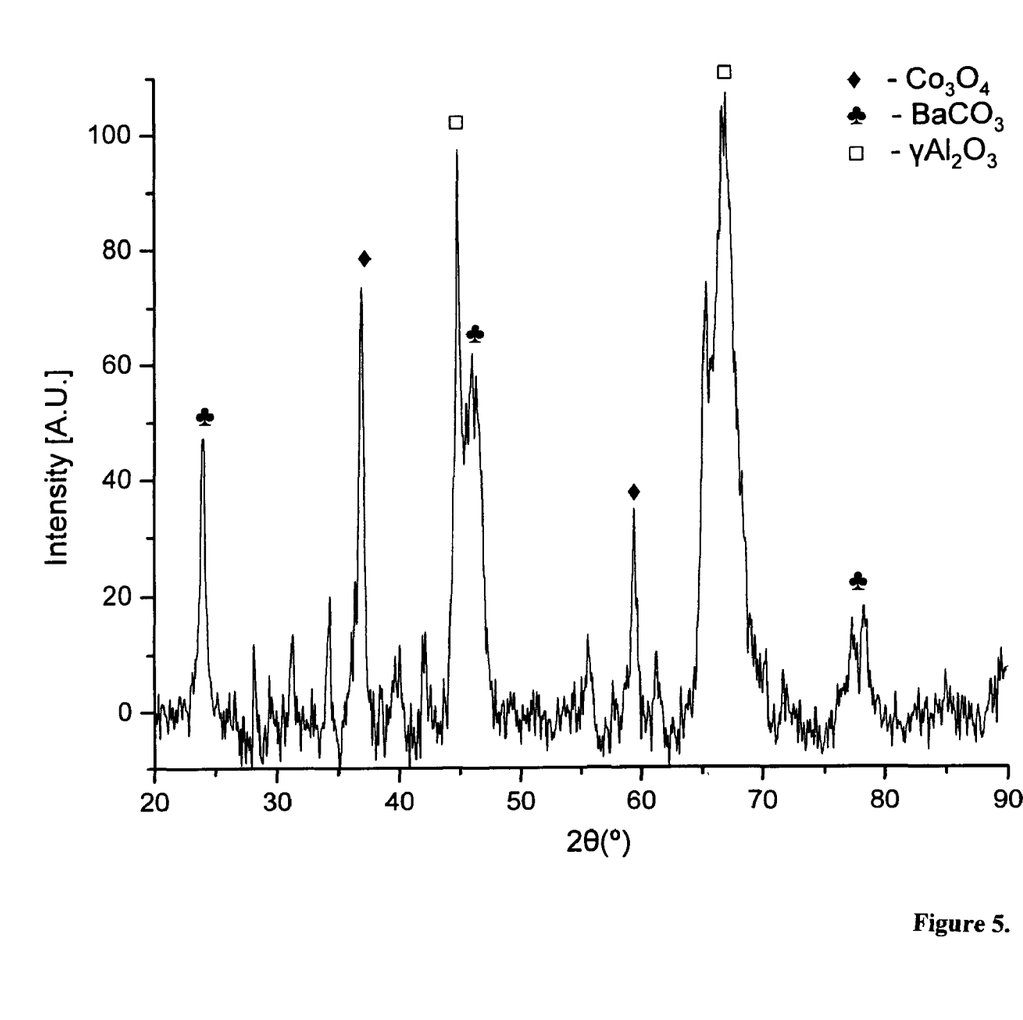
FIG. 5 is the X-ray diffraction pattern of the catalyst 5Co/15Ba.

FIG. 5 depicts the X-ray diffraction pattern of the catalyst 5Co/15Ba following baseline correction and smoothing using a 2 order polynomial, 11 point Savitzky-Golay algorithm. The peaks at approximately 37.3 2θ and approximately 59.0

2θ is attributed to cubic $Co_3O_4$, a material known for its high oxidizing capacity, which can explain the relatively high promotional effect of cobalt over both manganese and iron. The relatively strong peak at approximately 46.0 2θ is attributed to $BaCO_3$. The peak at approximately 23.8 2θ is also attributed to $Co_3O_4$.

The Pt-free catalysts will have a lean $NO_x$ storage ratio of 1.3 or greater. Other Pt-free catalysts can have a lean $NO_x$ storage ratio of 1.5 or greater. Still other Pt-free catalysts can have a lean $NO_x$ storage ratio of 2.0 or greater.

The lean $NO_x$ storage ratio for a Pt-free catalyst is defined by the following relationship:

$$[yBa\ zCo]/\{[yBa]+[zCo]\}$$

wherein [yBa zCo] is the lean $NO_x$ storage value for a Pt-free catalyst of the invention containing cobalt and barium; [yBa] is the lean $NO_x$ storage value for a barium catalyst; and [zCo] is the lean $NO_x$ storage value for a cobalt. As already described above and in Example 1, the lean $NO_x$ storage values are determined by measuring the integrated area between the inlet $NO_x$ concentration and outlet $NO_x$ concentration in the fuel lean state from time zero to the time the outlet $NO_x$ concentration is 300 ppm for each of the nitrogen storage catalysts.

Again, if one uses the catalytic data provided in FIG. 2 for each of the tested catalysts, that is, a lean $NO_x$ storage value of 5 μmol/g for [15Ba], 6 μmol/g for [5Co] and 31 μmol/g for [5Co/15Ba] one would obtain a lean $NO_x$ storage ratio of 31/11 or 2.82.

Figure 4:
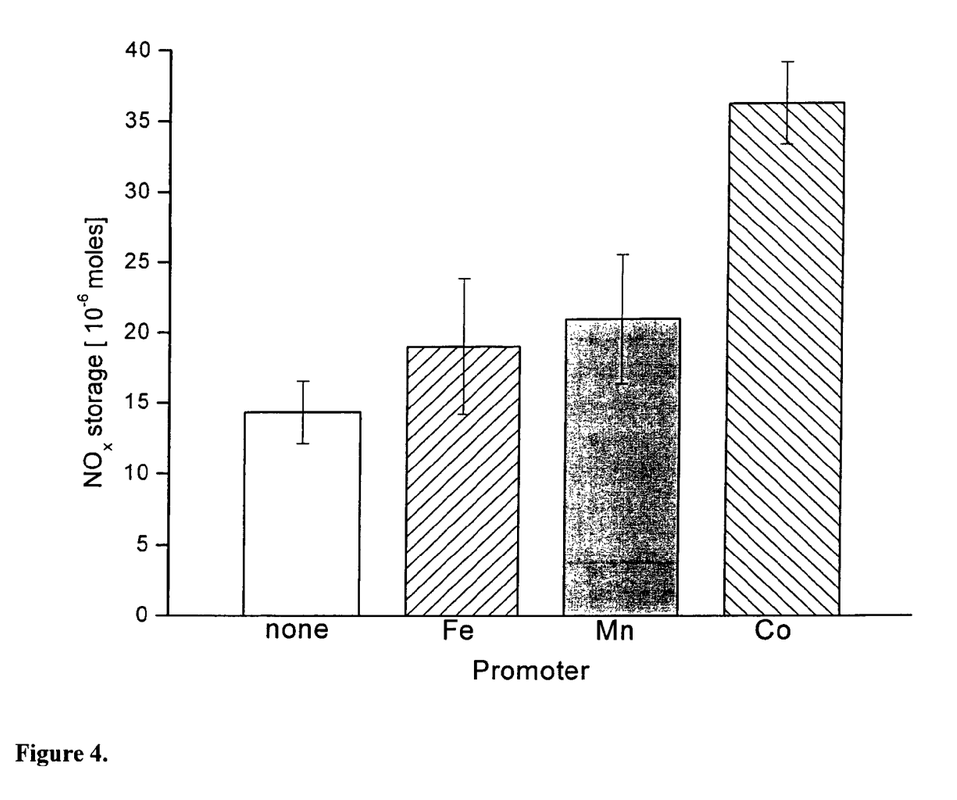
FIG. 4 is a graphical representation of catalysts with different transition metals.

FIG. 4 is a graphical representation of catalysts with different transition metals. In this case, a traditional 0.5Pt/7.5Ba $NO_x$ storage catalyst was modified by incorporating 2.5Fe, 2.5Mn or 2.5Co. The addition of either iron or manganese shows an increase in the $NO_x$ storage by 25-30%, whereas Co has a considerably higher promotional effect increasing lean $NO_x$ storage by more than 100%.

The catalyst can be supported on many types of inorganic oxides selected from the group consisting of alumina, silica, titania, zirconia aluminosilicates, and mixtures thereof with alumina being preferred. For example, high surface area alumina materials, also referred to as gamma alumina typically exhibit a BET (Brunauer, Emmett, and Teller) surface area in excess of 60 square meters per gram ($m^2/g$), and often up to about 200 $m^2/g$ or more. Such activated alumina is usually a mixture of the gamma and delta phases of alumina. Metal oxides other than activated alumina can also be used as a catalyst support. For example, bulk ceria, zirconia, alpha alumina and other materials are known for such use. Although many of these materials have a lower BET surface area than activated alumina, that disadvantage tends to be offset by the greater durability of the resulting catalyst.

The inorganic oxides can also include zeolites, in particular, zeolites in admixture with one or more of the support oxide materials listed in the above paragraph. Zeolites coated with the cobalt, barium, and optionally platinum, are of particular importance for achieving as low a light-off temperature as possible for the hydrocarbons in diesel exhaust gas. Owing to their acid surface properties, zeolites have a high cracking activity for the long-chained hydrocarbons of the exhaust gas. The long-chained molecules are therefore broken down into smaller fragments by contact with the zeolites, which smaller fragments can then more readily be oxidized by the cobalt and/or platinum in the $NO_x$ storage catalysts. The weight ratios of the support oxides and the zeolites is from 10:1 to 2:1, and in most instances the weight ratios is from 8:1 to 3:1. Particularly advantageous and ageing-resistant oxidizing activities for carbon monoxide and hydrocarbons can be achieved with a weight ratio of 7:1 to 5:1.

Of the large number of zeolites available, the following are especially suitable beta-zeolites, zeolites of the faujasite type, such as, for example, Y-zeolites, especially de-aluminized Y-zeolites, mordenites and zeolites, having a high silicon dioxide content, of the pentasil type, especially ZSM-5. Each of the above zeolites can be used alone or in an admixture of one or more zeolites. The zeolites are preferably used in their acid $H^+$ form. De-aluminized Y-zeolites and ZSM-5 zeolites, each having a modulus of more than 30, typically more than 40, can have unique advantages. The modulus of a zeolite denotes its molar ratio of silicon dioxide to aluminum oxide.

The inorganic oxide can also be treated with a titanium-zirconium (Ti—Zr) composite oxide. The Ti—Zr composite oxide will contain a molar ratio of titanium to zirconium from 1/9 to 9/1. Preparation of a refractory inorganic support containing the Ti—Zr composite is described in U.S. Pat. No. 5,804,152, the entire disclosure of which is incorporated herein by reference.

The oxide support can be in any configuration, shape, or size which exposes the metal components of the catalyst to the exhaust gas to be treated. The choice of configuration, shape and size of the support will depend in-part on the specific use of the catalysts. Convenient shapes that can be used include solid particulate forms such as pills, pellets, granules, rings, spheres, etc. The particulate form can be advantageous if large volume of catalyst is required, or if periodic replacement of the catalyst is required.

The catalysts of the invention are typically prepared by impregnating the inorganic oxide with one or more solutions containing cobalt, platinum and barium. The process of impregnating metals on and in inorganic supports, e.g., alumina, is well known to those of ordinary skill in the art.

It is to be understood by one of ordinary skill in the art that metal containing solutions of any metal concentration can be used, particularly, if a multiple loading impregnating procedure is used. For example, if a 5 w/w % cobalt nominal weight loading is desired, one or more impregnating steps can be used until the desired loading of cobalt is achieved.

The $NO_x$ storage catalysts can be used in combination with one or more reduction catalysts, in particular reduction catalysts containing rhodium. The reduction catalyst is needed to reduce the stored $NO_x$ under fuel rich conditions. For example a nitrogen storage and reduction catalyst can contain both platinum and cobalt as the oxidizing metals, barium as the $NO_x$ storage material, and rhodium as the reduction catalyst supported on a refractory inorganic oxide.

Alternatively, the $NO_x$ storage catalysts of the invention are "Pt-free" catalysts that contain cobalt as an oxidizing metal, barium as the $NO_x$ storage material, and rhodium as the reduction catalyst supported on an inorganic oxide.

Example 1

High Throughput Experimental Setup and Testing Procedure

All catalytic tests were performed using a 16-channel parallel reactor. Details concerning the reactor has been described in J. Lauterbach et al., in *Applied Catalysis*, A 254, (2003) 357, of which the description and operation of the 16-channel parallel reactor is incorporated herein by reference. The reaction products from all 16 channels were analyzed simultaneously using Fourier transform infrared (FTIR) imaging. The optical setup consists of a Bruker Equinox 55 FTIR spectrometer interfaced with a 64×64 pixel mercury cadmium telluride FPA detector (Santa Barbara Focalplane, Goleta, Calif., USA) capable of collecting IR spectra of the effluents from all 16 reactors in less than 2 seconds. Details of the optical setup and analytical methods can be found in previous publications.

A typical data set collected during a switch from fuel rich to fuel lean conditions for three different catalysts is shown in FIG. 1. The outlet $NO_x$ concentration profiles are shown as functions of time, with the dotted lines representing the inlet $NO_x$ concentration and 300 ppm $NO_x$. The performance of each catalyst was based on the $NO_x$ storage, defined as the integrated area between the inlet $NO_x$ concentration and outlet $NO_x$ concentration, in the fuel lean state, from time zero to the time when the outlet $NO_x$ concentration reached 300 ppm. Catalytic performance was evaluated when the $NO_x$ storage behavior became reproducible over several cycles. The feed gas consisted of 0.14% v/v $NO_x$ 6% v/v $O_2$, 0.9% v/v CO, 0.15% v/v $C_2H_4$ in helium for the fuel lean phase at a space velocity of 42,000 mL/h/gm catalyst. The fuel rich phase was simulated by replacing the oxygen with an equal volume of helium while maintaining the other flow rates constant at the fuel lean conditions. The catalysts were cycled multiple times between 15 minutes of fuel rich phase and 30 minutes of fuel lean phase. For all results reported, 150 mg of catalyst was loaded into each reactor, and all reactions were performed at a temperature of 648 K.

Fuel rich and fuel lean conditions refer to the molar ratio of oxidizing to reducing molecules as defined by the stoichiometric ratio SR:

$$SR=\{[NO]+2[O_2]\}/\{[CO]+6[C_2H_4]\}$$

A SR value of greater than 1 refers to fuel lean conditions, and a SR value of less than one refers to fuel rich conditions.

The 0.5Pt/7.5Ba/2.5Co catalyst was tested under 32 different reaction conditions with varying temperature and feed gas compositions provided in Table 1. This catalyst consistently showed an increase of three fold in the lean $NO_x$ storage as compared to the 0.5Pt/7.5Ba for nearly all of the reaction conditions. These experimental results further verify the promotional effect of cobalt on $NO_x$ storage over a wide range of reaction conditions. The space velocity for all of the testing in Table 1 was 42,500 (mL/hr/g catalyst)

TABLE 1

| Reaction Condition | NO Conc. (ppm) | $O_2$ Conc. (%) | Eq CO Conc. (%) | CO Fraction | CO Conc. (%) | $C_2H_4$ Conc. | Temp (K) | $NO_x$ Storage value |
|---|---|---|---|---|---|---|---|---|
| 1 | 920 | 4 | 1 | 0 | 0 | 0.17 | 698 | 22.6 |
| 2 | 1930 | 4 | 1 | 0 | 0 | 0.17 | 598 | 43.6 |
| 3 | 920 | 8 | 1 | 0 | 0 | 0.17 | 598 | 48.3 |
| 4 | 1930 | 8 | 1 | 0 | 0 | 0.17 | 698 | 32.5 |
| 5 | 920 | 4 | 2.6 | 0 | 0 | 0.43 | 598 | 83.2 |
| 6 | 1930 | 4 | 2.6 | 0 | 0 | 0.43 | 698 | 27.1 |
| 7 | 920 | 8 | 2.6 | 0 | 0 | 0.43 | 698 | 79.0 |
| 8 | 1930 | 8 | 2.6 | 0 | 0 | 0.43 | 598 | 59.9 |
| 9 | 920 | 4 | 1 | 1 | 1 | 0 | 598 | 37 |
| 10 | 1930 | 4 | 1 | 1 | 1 | 0 | 698 | 25.3 |
| 11 | 920 | 8 | 1 | 1 | 1 | 0 | 698 | 24.1 |
| 12 | 1930 | 8 | 1 | 1 | 1 | 0 | 598 | 39.4 |
| 13 | 920 | 4 | 2.6 | 1 | 2.6 | 0 | 698 | 17.0 |
| 14 | 1930 | 4 | 2.6 | 1 | 2.6 | 0 | 598 | 40.4 |
| 15 | 920 | 8 | 2.6 | 1 | 2.6 | 0 | 598 | 37.0 |
| 16 | 1930 | 8 | 2.6 | 1 | 2.6 | 0 | 698 | 29.3 |
| 17 | 920 | 6 | 1.8 | 0.5 | 0.9 | 0.15 | 648 | 33.7 |
| 18 | 2430 | 6 | 1.8 | 0.5 | 0.9 | 0.15 | 648 | 35.9 |
| 19 | 1420 | 2 | 1.8 | 0.5 | 0.9 | 0.15 | 648 | 37.1 |
| 20 | 1420 | 10 | 1.8 | 0.5 | 0.9 | 0.15 | 648 | 38.3 |
| 21 | 1420 | 6 | 1 | 0.5 | 0.5 | 0.08 | 648 | 33.4 |

TABLE 1-continued

| Reaction Condition | NO Conc. (ppm) | $O_2$ Conc. (%) | Eq CO Conc. (%) | CO Fraction | CO Conc. (%) | $C_2H_4$ Conc. | Temp (K) | $NO_x$ Storage value |
|---|---|---|---|---|---|---|---|---|
| 22 | 1420 | 6 | 2.6 | 0.5 | 1.3 | 0.22 | 648 | 34 |
| 23 | 1420 | 6 | 1.8 | 0 | 0 | 0.3 | 648 | 45.7 |
| 24 | 1420 | 6 | 1.8 | 1 | 1.8 | 0 | 648 | 31.9 |
| 25 | 1420 | 6 | 1.8 | 0.5 | 0.9 | 0.15 | 548 | 29.4 |
| 26 | 1420 | 6 | 1.8 | 0.5 | 0.9 | 0.15 | 748 | 15.3 |
| 27 | 1420 | 6 | 1.8 | 0.5 | 0.9 | 0.15 | 648 | 34.6 |
| 28 | 1420 | 6 | 1.8 | 0.5 | 0.9 | 0.15 | 648 | 38.1 |
| 29 | 1420 | 6 | 1.8 | 0.5 | 0.9 | 0.15 | 648 | 31.9 |
| 30 | 1420 | 6 | 1.8 | 0.5 | 0.9 | 0.15 | 648 | 39.1 |
| 31 | 1420 | 6 | 1.8 | 0.5 | 0.9 | 0.15 | 648 | — |
| 32 | 1420 | 6 | 1.8 | 0.5 | 0.9 | 0.15 | 648 | 36.9 |

Example 2

1. Catalyst Preparation

The catalysts were synthesized via incipient wetness on gamma-$Al_2O_3$ (Catalox® Sba-200 $m^2/g$). A list of Pt/Co catalysts tested in this study is shown in Table 1. The naming convention for each catalyst throughout the paper is based on the nominal weight loading. Thus, a catalyst with a nominal weight loading of 1% w/w Pt and 15% w/w Ba is referred to as 1Pt/15Ba. Chloroplatinic acid hexahydrate, barium nitrate, cobalt nitrate, iron (III) nitrate nonahydrate, and magnesium nitrate precursors (Strem Chemicals) were dissolved in distilled water prior to impregnation.

Details concerning the impregnation procedure is described in J. Lauterbach et al., in *Catalysis Today*, 98(3) (2004) 375, of which the impregnation procedure is incorporated herein by reference. The use of impregnating inorganic oxide supports with the desired weight loading of different metals is well known in the art. A catalyst with the desired weight loadings was prepared by dissolving the necessary amount of metal precursor in distilled water. The solutions were added to the dried oxide support until incipient wetness was obtained. The impregnated oxide supports were dried overnight in a vacuum oven at a temperature of about 393 K and then crushed before the next impregnation step. This process was repeated until the entire precursor solution had been added to the support. In particular, because of the low solubility of barium nitrate in water, it was necessary to utilize multiple impregnation steps to achieve the desired weight loadings.

After completion of the final impregnation step, the powders were crushed and calcined in a furnace. All catalysts were calcined by heating to 473 K over two hours, holding the temperature at 473 K for one hour, further heating to 823 K over three hours, holding at 823 K for two hours, and then cooling to 298 K. In addition, all catalysts were reduced in the high-throughput reactor for 1 hour in 10% v/v $H_2$/He at 773 K before performing the reaction studies.

The preparation of 1.5 g of the $NO_x$ storage catalyst, 1Pt/15Ba/5Co, is provided below. Similar procedures were used to prepare the other catalysts listed in Table 2. An aqueous solution of chloroplatinic acid hexahydrate (0.0398 g) was used to obtain a nominal weight percent loading of 1% Pt on 1.5 g of γ-alumina. For example, the weight fraction of platinum in chloroplatinic acid hexahydrate is 0.37. As a result, the amount of chloroplatinic acid hexahydrate required is (0.015/0.37) or 0.0398 g. Similarly, one can calculate the amount of barium nitrate (0.4282 g) and cobalt nitrate (0.3704 g) required for a nominal weight loading of Ba 15% and Co 5%, respectively.

The metal precursors were dissolved and mixed together with an appropriate amount of water based on their respective solubility. The mixture (solution) was then added to dried γ-alumina support in multiple steps based on the incipient wetness of the support material. The impregnated oxide support was dried overnight in a vacuum oven at a temperature of about 393 K and then crushed before the next impregnation step. This process was repeated until the entire precursor solution had been added to the support. In particular, because of the low solubility of barium nitrate in water, it was necessary to utilize multiple impregnation steps to achieve the desired weight loadings. After completion of the final impregnation step, the powder was crushed and then calcined as described above.

2. Characterization Procedures

The actual weight loadings of all catalysts were verified by atomic absorption spectroscopy (S series atomic absorption spectrometer, Thermo Electron), and are listed in Table 2. The actual platinum weight loadings of the catalysts were significantly less than the nominal loadings, implying that the oxidizing capacity demonstrated by the Pt/Co catalysts was mainly associated with Co. For example, if we attempted to prepare a catalysts with 1% Pt, which we call nominal loading, the actual amount of platinum actually present in the catalyst (as measured by atomic absorption spectroscopy) was significantly less (See, Table 2).

X-ray diffraction patterns were acquired under atmospheric conditions with a Philips X'Pert diffractometer using Cu Kα radiation at 40 kV and 40 mA.

TABLE 2

| Catalyst | Pt nom. wt % | Pt act. wt % | Ba nom. wt % | Ba act. wt % | Co nom. wt % | Co act. wt % |
|---|---|---|---|---|---|---|
| 0.5Pt/7.5Ba | 0.5 | 0.16 | 7.5 | 3.95 | — | — |
| 0.5Pt/7.5Ba/2.5Co | 0.5 | 0.20 | 7.5 | 4.82 | 2.5 | 2.88 |
| 1Pt | 1.0 | 0.43 | — | — | — | — |
| 5Co | — | — | — | — | 5 | 5.32 |
| 1Pt/5Co | 1.0 | 0.37 | — | — | 5 | 5.76 |
| 1Pt/15Ba | 1.0 | 0.58 | 15 | 11.75 | — | — |
| 1Pt/5Co/15Ba | 1.0 | 0.37 | 15 | 12.88 | 5 | 6.32 |
| 5Co/15Ba | — | — | 15 | 12.57 | 5 | 5.3 |

Example 3

Figure 6:
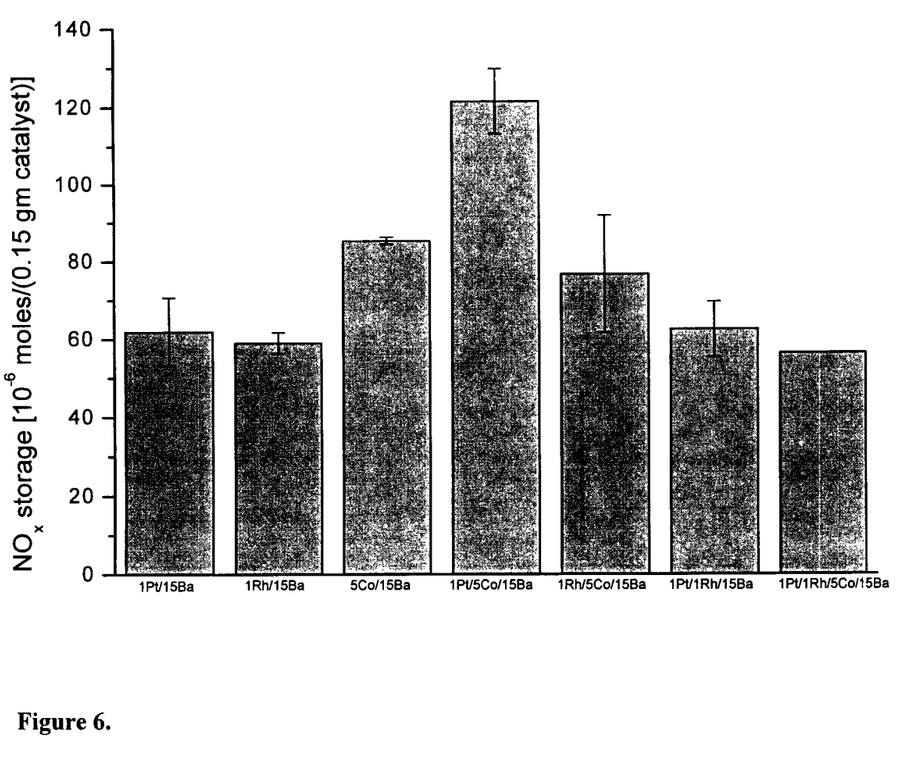
FIG. 6 is a graphical representation comparing the performance of the various catalyst systems to treat simulated diesel exhaust gas.

We have used a simulated diesel exhaust gas with the component compositions indicated in Table 3. The data of FIG. 6 shows the results (in terms of $NO_x$ storage) from testing of a variety of Co containing NSR catalysts for simulated diesel exhaust conditions. FIG. 6 also includes the results from two different noble metal containing catalysts (Pt and Rh). Three different reducing agents and 5% $CO_2$ in the feed stream were used for testing. He was used as the carrier gas.

All catalysts were tested at 375° C. The error bars are calculated from the repeats of the same catalyst tested at a later time. It can be inferred from these results that a catalyst composition of 5% Co and 15% Ba catalysts actually performs better than all of the tested Pt/Ba and Rh/Ba catalyst compositions. The addition of 5% Co to catalysts containing 1Pt/15Ba effectively doubles the storage capacity. A similar increase has been observed with the 1Rh/15Ba catalyst composition.

The catalyst containing both platinum and rhodium did not perform as well as the inventive catalysts. Similar, results for Pt/Rh combinations have been reported in the literature by Fridell et. al., but for different reaction conditions.

TABLE 3

| Reaction gas | Lean | Rich |
|---|---|---|
| $O_2(\%)$ | 9 | 1 |
| $NO(\%)$ | 0.08 | 0.08 |
| $CO(\%)$ | 0.05 | 3 |
| $C_2H_4(\%)$ | 0.04 | 1 |
| $H_2(\%)$ | 0.03 | 1 |
| $CO_2(\%)$ | 5 | 5 |

We claim:

1. A $NO_x$ storage catalyst comprising cobalt and barium, wherein said $NO_x$ storage catalyst has a lean $NO_x$ storage ratio of 1.3 or greater.

2. The $NO_x$ storage catalyst as recited in claim 1, wherein said lean $NO_x$ storage ratio is 2.0 or greater.

3. The $NO_x$ storage catalyst as recited in claim 1 in combination with a reduction catalyst containing rhodium.

4. The $NO_x$ storage catalyst as recited in claim 1, further comprising platinum.

5. The $NO_x$ storage catalyst as recited in claim 4, wherein said lean $NO_x$ storage ratio is 1.7 or greater.

6. The $NO_x$ storage catalyst as recited in claim 1, wherein said cobalt is predominantly in the form of $Co_3O_4$ and the barium in the form of $BaCO_3$.

7. The $NO_x$ storage catalyst as recited in claim 1, wherein:
   (i) said cobalt is present from 1 weight % to 8 weight %, and
   (ii) said barium is present from 2 weight % to 20 weight %, wherein said-weight % is determined on a metal basis with respect to the total weight of the catalyst.

8. The $NO_x$ storage catalyst as recited in claim 7, further comprising platinum, wherein said platinum is present from 0.03 weight % to 1.0 weight %.

9. The $NO_x$ storage catalyst as recited in claim 7, wherein:
   (a) said cobalt is present from 2 weight % to 6 weight %, and
   (b) said barium is present from 3 weight % to 12 weight %.

10. The $NO_x$ storage catalyst as recited in claim 9, further comprising platinum, wherein said platinum is present from 0.05 weight % to 0.5 weight %.

11. A $NO_x$ storage catalyst consisting essentially of cobalt, platinum, and barium, supported on an inorganic oxide, wherein said $NO_x$ storage catalyst has a lean $NO_x$ storage ratio of 1.3 or greater.

12. A $NO_x$ storage catalyst consisting essentially of cobalt and barium supported on an inorganic oxide, wherein said $NO_x$ storage catalyst has a lean $NO_x$ storage ratio of 1.3 or greater.

13. The $NO_x$ storage catalyst of claim 12, wherein:
   (a) said cobalt is present from 1 weight % to 8 weight %, and
   (b) said barium is present from 2 weight % to 20 weight %, wherein said weight % determined on a metal basis with respect to the total weight of the catalyst.

14. The $NO_x$ storage catalyst as recited in claim 13, wherein:
(a) said cobalt is present from 2 weight % to 6 weight %, and
(b) said barium from 3 weight % to 12 weight %.

15. The $NO_x$ storage catalyst as recited in claim 14 further comprising platinum, wherein said platinum is present from 0.05 weight % to 0.5 weight %.

16. A method of reducing $NO_x$ emissions from a diesel engine or a gas-combustion engine, comprising, contacting:
(a) a $NO_x$ storage catalyst, comprising cobalt and barium, wherein said $NO_x$ storage catalyst has a lean $NO_x$ storage ratio of 1.3 or greater; with
(b) the exhaust gas from said diesel engine or said gas-combustion engine.

17. The method of reducing $NO_x$ emissions as recited in claim 16, wherein said $NO_x$ storage catalyst further comprises platinum.

18. A method of reducing $NO_x$ emissions from a diesel engine or a gas-combustion engine, comprising, contacting:
(a) a $NO_x$ storage catalyst, consisting essentially of cobalt in the form of $Co_3O_4$, barium in the form of $BaCO_3$, and platinum, supported on an inorganic oxide, with
(b) the exhaust gas of the lean-burn said diesel engine or said gas-combustion engine, wherein said $NO_x$ storage catalyst has a lean $NO_x$ storage ratio of 1.3 or greater.

19. The method as recited in claim 18, wherein, in said $NO_x$ storage catalyst:
(i) said cobalt is present from 1 weight % to 8 weight %;
(ii) said barium is present from 2 weight % to 20 weight %; and
(iii) said platinum is present from 0.03 weight % to 1.0 weight %;
wherein said weight % is determined on a metal basis with respect to the total weight of said $NO_x$ storage catalyst.

20. A $NO_x$ storage catalyst consisting essentially of cobalt, platinum, and barium, supported on an inorganic oxide, wherein:
(a) said $NO_x$ storage catalyst has a lean $NO_x$ storage ratio of 1.3 or greater, and
(b) said $NO_x$ storage catalyst includes the following X-ray diffraction peaks:
(i) approximately 36.8 2θ;
(ii) approximately 59.9 2θ; and
(iii) approximately 46.0 2θ.

21. A catalyst consisting essentially of 1 weight % to 8 weight % cobalt; 2 weight % to 20 weight % barium; and 0.03 weight % to 1.0 weight % platinum, supported on an inorganic oxide, said weight % determined on a metal basis with respect to the total weight of the catalyst, and said catalyst has a lean $NO_x$ storage ratio of 1.3 or greater.

22. A catalytic converter for a vehicle comprising said $NO_x$ storage catalyst of claim 1.

23. A catalytic converter for a vehicle comprising said $NO_x$ storage catalyst of claim 7.

24. A catalytic converter for a vehicle comprising said catalyst of claim 21.

25. A $NO_x$ storage catalyst consisting essentially of cobalt and barium supported on an inorganic oxide, wherein
(a) said $NO_x$ storage catalyst has a lean $NO_x$ storage ratio of 1.3 or greater, and
(b) said $NO_x$ storage catalyst includes the following X-ray diffraction peaks:
(i) approximately 37.3 2θ;
(ii) approximately 46.0 2θ; and
(iii) approximately 59.0 2θ.

26. A process for treating the exhaust gas from a diesel engine or gas-combustion engine, comprising contacting said exhaust gas from said diesel engine or said gas-combustion engine with a $NO_x$ storage catalyst consisting essentially of cobalt, platinum, and barium, supported on an inorganic oxide, wherein:
(a) said $NO_x$ storage catalyst has a lean $NO_x$ storage ratio of 1.3 or greater, and
(b) said $NO_x$ storage catalyst includes the following X-ray diffraction peaks:
(i) approximately 36.8 2θ;
(ii) approximately 59.9 2θ; and
(iii) approximately 46.0 2θ.

27. A process for treating the exhaust gas from a diesel engine or gas-combustion engine, comprising contacting said exhaust gas from said diesel engine or said gas-combustion engine with a $NO_x$ storage catalyst consisting essentially of cobalt and barium supported on an inorganic oxide, wherein
(a) said $NO_x$ storage catalyst has a lean $NO_x$ storage ratio of 1.3 or greater, and
(b) said $NO_x$ storage catalyst includes the following X-ray diffraction peaks:
(i) approximately 37.3 2θ;
(ii) approximately 46.0 2θ; and
(iii) approximately 59.0 2θ.

28. A process for treating the exhaust gas from a diesel engine or gas-combustion engine, comprising contacting said exhaust gas from said diesel engine or said gas-combustion engine with a $NO_x$ storage catalyst, wherein:
(a) said $NO_x$ storage catalyst comprises cobalt and barium;
(b) said $NO_x$ storage catalyst has a lean $NO_x$ storage ratio of 1.3 or greater;
(c) said cobalt is present from 1 weight % to 8 weight %;
(d) said barium is present from 2 weight % to 20 weight %; and
(e) said weight % is determined on a metal basis with respect to the total weight of the catalyst.

29. A process for treating the exhaust gas from a diesel engine or gas-combustion engine, comprising contacting said exhaust gas from said diesel engine or said gas-combustion engine with a $NO_x$ storage catalyst, said $NO_x$ storage catalyst consisting essentially of 1 weight % to 8 weight % cobalt; 2 weight % to 20 weight % barium; and 0.03 weight % to 1.0 weight % platinum, supported on an inorganic oxide, said weight % determined on a metal basis with respect to the total weight of the catalyst, and said catalyst has a lean $NO_x$ storage ratio of 1.3 or greater.

* * * * *